United States Patent [19]
Long

[11] 3,747,783
[45] July 24, 1973

[54] WRECKER SLING PIN LOCK

[76] Inventor: William T. Long, 3242 M. St. N.W., Washington, D.C. 20007

[22] Filed: Jan. 28, 1972

[21] Appl. No.: 221,768

Related U.S. Application Data
[62] Division of Ser. No. 55,743, July 17, 1970.

[52] U.S. Cl. ............................. 214/86 A, 224/42.25
[51] Int. Cl. ............................................... B60p 3/12
[58] Field of Search .................. 214/86 A; 280/402; 224/42.25

[56] References Cited
UNITED STATES PATENTS
1,132,486   3/1915   Oster ........................... 224/42.25 X
1,404,003   1/1922   Belden ........................ 224/42.25 X

*Primary Examiner*—Albert J. Makay
*Attorney*—Thomas E. Beall, Jr.

[57] ABSTRACT

A coupling pin is provided for pivotally securing the lower bracket of a tow truck sling to the tow truck frame to prevent theft, with the coupling pin having a shaft provided with one or more through diametric bores at one end for reception of a padlock and an enlarged head at the other end. To further make theft difficult by reinforcing the pin and to provide an annular abutment, a sleeve is telescoped over the padlock end of the shaft so that its opposed bores will align with the bore of the shaft for common reception of the padlock shackle.

4 Claims, 3 Drawing Figures

PATENTED JUL 24 1973 3,747,783

INVENTOR
WILLIAM T. LONG

BY Thomas E. Beall, Jr.

ATTORNEY

WRECKER SLING PIN LOCK

This ia a division of application Ser. No. 55,743, filed July 17, 1970.

BACKGROUND OF THE INVENTION

Most conventional tow trucks are provided with a rearwardly extending boom having a pulley or the like for supporting a lifting cable that is provided with a hook at its lower end, which hook engages in an eye portion of a sling mechanism that has its only other contact with the tow truck body being provided by conventional threaded bolts or bolts with a cotter pin. Thus it is seen that removal of the sling from the tow truck body may be accomplished merely by lifting the eye portion from the cable hook and removing the pivot pins after first removing a simple threaded nut or cotter pin. As a result of this easy detachment, theft of the sling mechanism is quite common, which sling mechanism costs several hundred dollars to a commercial establishment. Therefore, tow truck owners have a considerable burden of being careful that their tow trucks are not left unattended, providing enclosed parking space at night for the tow truck, or removing the sling mechanism from the tow truck and storing it in a locked building at night or other times for protection. Even with this considerable need, there is no satisfactory way to secure the sling to the truck to prevent theft.

SUMMARY OF THE INVENTION

It is an object of the present invention to prevent or substantially lessen the chances of theft of a tow truck wrecker sling by providing a security lock. The usual coupling pin provided between the tow truck body or frame and the lower bracket of the sling mechanism is replaced by a coupling pin according to the present invention that has a shaft provided with a head at one end and at least oen diametrically through bore at its other end, in combination with a telescoping sleeve having aligned bores and a security lock with its shackle passing through the bores of the sleeve and shaft. Since the shaft and head of the coupling pin of the present invention is constructed of hardened steel in the same manner as the conventional coupling pin heretofore used, the coupling pin of the present invention will be as strong as the prior art coupling pins at least with respect to this common area. The sleeve will space the through bore for the shackle a considerable distance from the loading point provided by interengaging portions of the bracket and tow truck frame, so that the shaft will not be weakened in any area of loading. Further, the sleeve will provide an annular abutment for the most desirable retention of the shaft. With respect to security, the hardened steel sleeve will further reinforce the shaft with respect to any attempt to cut the shaft with a hack saw or the like, and further, the sleeve will considerably improve the retention of the padlock so that it will thwart any attempt to break the padlock by twisting, cutting or the like.

BRIEF DESCRIPTION OF THE DRAWING

The general environment of the coupling pin according to the present invention is shown in FIG. 1, wherein a conventional tow truck is provided with a conventional sling mechanism for lifting vehicles as shown, which sling mechanism is attached to the tow truck frame by means of coupling pins according to the present invention.

DETAILED DESCRIPTION OF THE DRAWING

Figure 1:
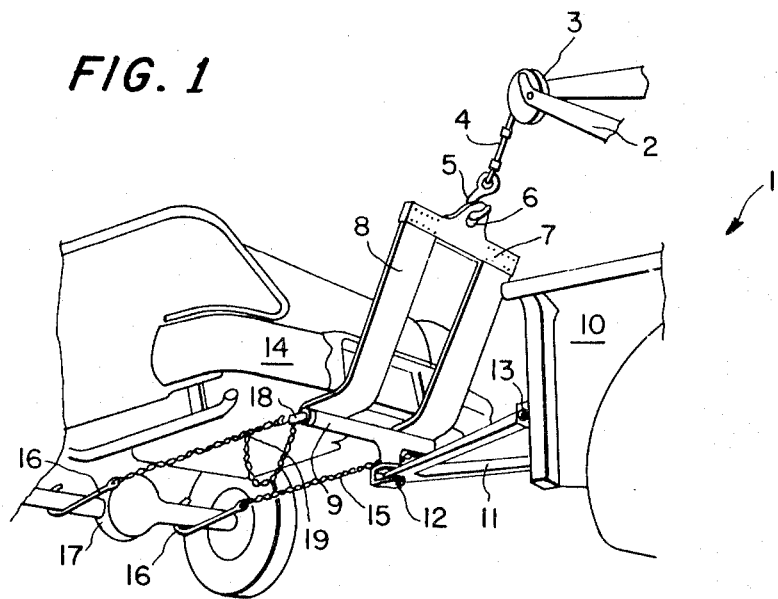

As shown in FIG. 1, a conventional tow truck 1 is provided with a rearwardly and upwardly extending boom 2 having a pulley 3 at its terminal end for receiving a mid portion of a lifting cable 4, which lifting cable 4 has a lifting hook 5 at its terminal end. In a conventional manner (not shown) the tow truck 1 has a power or hand winch used to let out or take in the cable 4 so as to operate the hook 5 in the manner of a crane. The hook 5 is received within an eye of a generally horizontally extending transverse rigid sling brace 7. In a conventional manner, the sling brace 7 has two depending resilient straps 8, although it is realized that any other type of conventional sling mechanism may be employed, for example using only a single strap. The lower ends of the straps 8 are rigidly secured and supported together by means of a rigid lower sling brace 9 that is generally parallel to the upper sling brace 7. The lower sling brace 9 is mounted to the tow truck frame or body 10 by means of a generally horizontally extending bracket 11, which is mounted at 12 to the central portion of the lower sling brace 9. A vertical axis pivot or universal joint may be provided for the mounting 12, but in any event, the mounting 12 is of a permanent type, that is, it may not be disassembled without destroying one of the elements. The other or forward end of the bracket 11 is secured to the frame 10 by means of two (only one being shown) coupling pins 13.

In a conventional manner, the sling mechanism may be used to lift automobiles as shown in FIG. 1 by first letting out the lifting cable 4 by means of the winch (not shown) so that the entire sling mechanism will drop down from its illustrated position with pivoting of the bracket 11 in the counter clockwise direction about the coupling pins 13. Thereafter, the tow truck is backed towards the vehicle so that the lower sling brace 9 is placed well underneath and inwardly of the adjacent vehicle bumper 14. In this position, the chains 15 are placed with their hooks 16 about a frame portion of the vehicle, preferably, about the half-axle housings of the differential 17. The opposite ends of the chains 15 are then securely attached to wedging hooks 18 carried on the opposite terminal ends of the lower sling brace 9. The unused portion of the chains 15 are merely looped back out of the way and secured at a convenient place by their small hooks 19. After thus attaching the car, the winch is operated to take in the lifting cable 4 so that the entire sling mechanism is picked up and the bracket 11 is pivoted in the clockwise direction about the coupling pins 13. The lifting is continued until the adjacent suspension end of the automobile is lifted entirely off the ground. From this, it is seen that the coupling pins 13 carry a considerable portion of the vehicle weight, must freely pivot and will be subjected to considerable acceleration forces and twisting action during towing of the vehicle. Therefore, the construction of these pins must be sturdy.

Theft of such a sling mechanism is quite simple in that conventional coupling pins are merely nuts and bolts or bolts with cotter pin holes. Therefore, to steal the sling mechanism, which costs several hundred dollars it is only necessary to remove the easily disassembled coupling pins and lift the upper sling brace 7 from the lifting hook 5. There is a considerable amount of interchangeability with respect to sling mechanisms and their theft is quite common.

Figure 2:
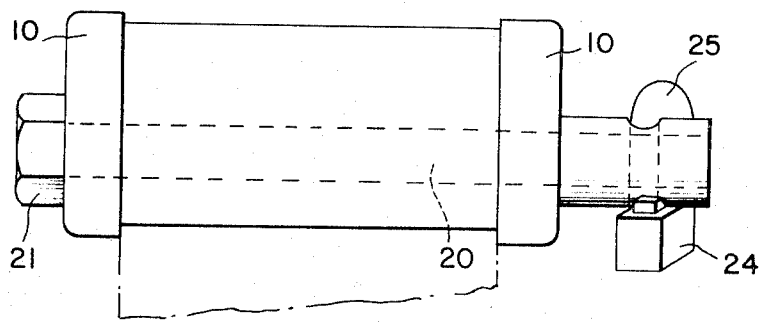
FIG. 2 is an enlarged detail view of the coupling pin according to the present invention with adjacent portions of the sling mechanism bracket and tow truck frame.
Figure 3:
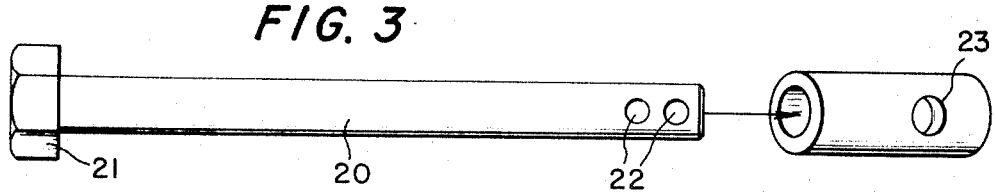
FIG. 3 is an unassembled view of the coupling pin, without the padlock.

The present theft of the sling mechanism, the coupling pins 13 of the present invention are constructed particularly as shown in FIGS. 2 and 3. A shaft 20 is provided with an enlarged head 21 at one end and with one or more diametrically through bores 22 at its other end. The shaft and head 21 are constructed of hardened steel to resist the considerable forces mentioned above. In use, the shaft 20 is passed through horizontally aligned bores in the bracket 11 and the tow truck frame 10. Thereafter, a sleeve 23, with an internal diameter substantially equal to the external diameter of the shaft 20, is telescopically slid on the exposed end of the shaft 20 so that its diametrically opposed bores 23 will be in alignment with one of the bores 22 in the shaft 20. Thereafter, a conventional security type of padlock 24 is assembled so that its shackle 25 passes through the aligned bores 22, 23. As used in this specification, the term security lock will include those locks that will prevent unauthorized opening by means of a combination, a key or the like.

From FIG. 2 it is seen that the bores 22 within the shaft 20 are not immediately adjacent the bracket and frame portions so that in the vicinity of the bores 22, the shaft is under substantially no stresses during the towing of a vehicle. To properly hold the shaft 20 in position, the sleeve having bores 23 will engage tightly against the adjacent portion of either the truck frame or bracket. Further, the sleeve will provide extra reinforcement for the exposed portion of a shaft 20 for resisting cutting or breakage thereof by a thief. In addition, the shackle 25 of the padlock 24 will be further protected by the sleeve in that it will enclose a large portion of the shackle and prevent the entry of many types of bolt cutters to the interior of a shackle root. Thus, the sleeve forms the function of spacing the through bores 22 from the stress area, diametrically reinforcing the exposed portion of the shaft 20, reinforcing and closing the padlock shackle for resisting cutting and twisting, and providing an annular abutment surface for the adjacent portion of the tow truck frame or bracket.

Although most sling mechanisms are interchangeable, the present invention is provided with means for limited adjustment. As shown in FIG. 3, a plurality of through diametric bores 22 are provided in the shaft 20, for selective registry with the bores of the sleeve to take care of different required axial coupling lengths. Correspondingly, the length of the sleeve will be sufficient in the axial direction to always insure that no diametric bore 22 will be too close to the stress area regardless of which bore 22 is used.

It is contemplated that the coupling pin mechanism of the present invention employing the headed shaft 20, the sleeve and padlock may be sold as a package unit in sufficient quantities to be used for replacing the conventional pins provided with tow truck sling mechanisms. In this manner, the operator or owner of the tow truck need only interchange pins at a relatively low cost to safeguard his considerable investment in the sling mechanism. With coupling pins of the present invention, considerable time and effort will be saved in that the tow truck operator will not have to be continually removing the sling mechanism for security purposes, and will not have to be watching his truck to prevent theft when he could be conducting other business.

What is claimed is:

1. A tow truck, comprising: a frame; a rearwardly extending boom with a rearward terminal end and a forward portion connected to the frame; a lifting cable with a hook at one end and mounted about the terminal end of the boom for raising and lowering the hook; a transverse rigid upper sling brace having an eye received on the hook; a lower transverse rigid sling brace; a resilient sling strap extending between the braces; a mounting bracket outwardly supporting the lower sling brace from the tow truck frame; means including horizontally aligned apertures in the frame and bracket and a coupling pivot pin extending through said apertures for pivotally mounting the bracket on the frame; said pin having an elongated shaft within the aligned apertures of the frame and bracket; a head portion integral with one end of said shaft, outside the apertures and being laterally larger than said shaft to prevent withdrawal of the inserted shaft in one direction from the aligned apertures; at least one substantially diametric through bore in the other end of said shaft; a sleeve having an internal diameter substantially equal to the external diameter of said shaft, and further having diametrically opposed through bores complimentary to the through bore in said shaft and a security lock means having a shackle extending through said sleeve and shaft bores to prevent removal of said shaft in the other direction from the aligned apertures.

2. The tow truck of claim 1, including a second through diametric bore in said shaft other end, axially spaced from said first mentioned shaft bore, for selective alignment of said sleeve bores with either of said shaft bores to change the effective axial connecting length of said shaft to accommodate different types of sling mounting brackets.

3. The tow truck of claim 1, wherein said lock is a key type padlock.

4. The tow truck of claim 1, wherein said head portion has an annular surface substantially perpendicular to said shaft, facing the other end, and engaging one of said frame and bracket; said sleeve having an annular surface engaging a corresponding surface on one of said frame and bracket; and the axial length, with respect to the axis of said shaft, between said head portion surface and said diametric through bore in the other end of said shaft being substantially equal to the axial length of the aligned apertures between said corresponding surfaces of said frame and bracket together with the axial length of said sleeve between said sleeve surface and diametrically opposed through bores so as to constitute means shielding said shaft and reenforcing said shackle.

* * * * *